United States Patent [19]

Horton et al.

[11] Patent Number: 5,033,503
[45] Date of Patent: Jul. 23, 1991

[54] VALVE AND PIPE COUPLING ASSEMBLY

[75] Inventors: Richard Horton; DeLaun T. Messick, both of Des Moines; Thomas A. Jensen, Boone, all of Iowa

[73] Assignee: Check-all Valve Mfg. Co., Des Moines, Iowa

[21] Appl. No.: 517,259

[22] Filed: May 1, 1990

[51] Int. Cl.⁵ ............................................. F16K 27/00
[52] U.S. Cl. .................................. 137/454.2; 251/148
[58] Field of Search ...................... 137/454.2; 251/148

[56] References Cited

U.S. PATENT DOCUMENTS

| | | | |
|---|---|---|---|
| 3,233,626 | 2/1966 | Hiers et al. | 137/494 |
| 3,434,495 | 3/1969 | Scaramucci | 137/454.2 X |
| 3,749,122 | 7/1973 | Gold | 137/515.7 |
| 4,022,245 | 5/1977 | Davis | 137/559 |
| 4,148,338 | 4/1979 | Skoli | 137/454.2 X |
| 4,532,958 | 8/1985 | Napolitano | 137/454.2 |
| 4,653,725 | 3/1987 | Nanz et al. | 251/148 X |
| 4,852,607 | 8/1989 | Scaramucci | 137/515.7 |

FOREIGN PATENT DOCUMENTS 1237863  6/1960  France ............................ 137/454.2

Primary Examiner—John C. Fox
Attorney, Agent, or Firm—Zarley, McKee, Thomte, Voorhees & Sease

[57] ABSTRACT

An annular shoulder on a valve body is clamped between opposite end portions of adjacent pipes locked together by a single clamp. Sealing is provided by O-rings positioned on the valve body on opposite sides of the annular shoulder between the valve body and the pipe sections.

2 Claims, 2 Drawing Sheets

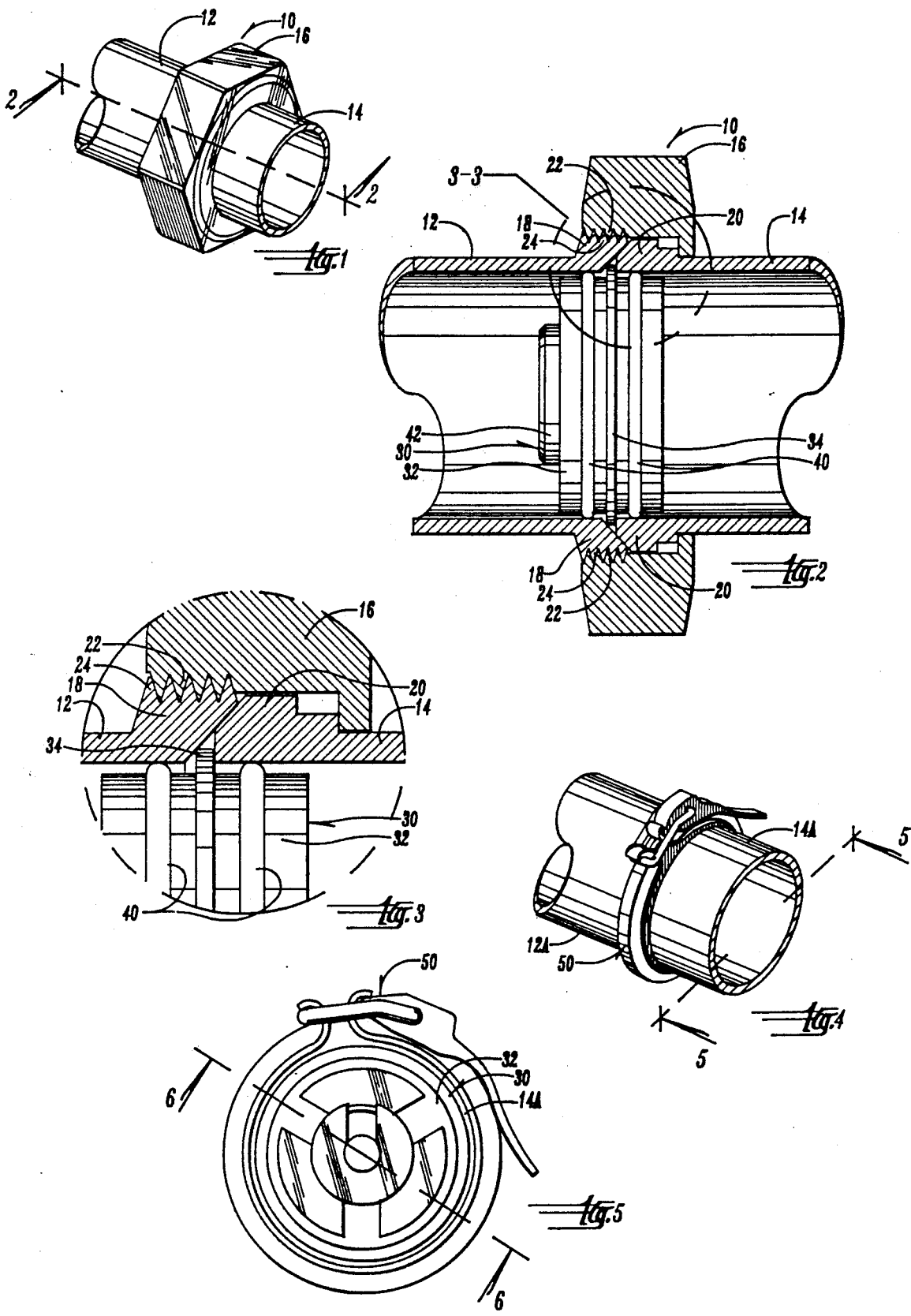

VALVE AND PIPE COUPLING ASSEMBLY

BACKGROUND OF THE INVENTION

The conventional check valve in pipe system will include valve body with oppositely extending pipe portions clamped to oppositely disposed pipe sections, two clamps are required. If a valve is to be positioned at a connection of two pipes it will be necessary to remove a portion of the pipes in order to accommodate the length of the valve body including the oppositely disposed pipe portions, as seen in FIG. 8.

Repair of the conventional valve often requires replacement of the entire valve body. This is an expensive and inefficient system to install and maintain.

SUMMARY OF THE INVENTION

A valve body having an annular shoulder is disposed between the adjacent ends of pipe sections clamped together. A single clamp is required and no alteration of the pipe ends is necessary to accommodate the valve. The valve may be easily installed and removed and maintained.

Sealing may be accomplished by placing O-rings on the valve body on opposite sides of the annular shoulder between the pipe sections and the valve body.

The valve body is securely stabilized in the pipe system. The pipe end portions may be suitably shaped to accommodate varying clamps including threaded and over center clamps.

DESCRIPTION OF THE DRAWINGS

FIG. 1 is a perspective view of the valve and pipe coupling assembly of this invention utilizing a threaded clamp for interconnecting the pipe end portions.

FIG. 2 is a cross-sectional view taken along line 2—2 in FIG. 1.

FIG. 3 is an enlarged cross-sectional view of a portion thereof indicated by the line 3—3 in FIG. 2.

FIG. 4 is a perspective view of a valve and pipe coupling assembly similar to that of FIG. 1, but utilizing an alternative over center type clamp.

FIG. 5 is a cross-sectional view taken along line 5—5 in FIG. 4.

DESCRIPTION OF THE PREFERRED EMBODIMENT

Figure 6:
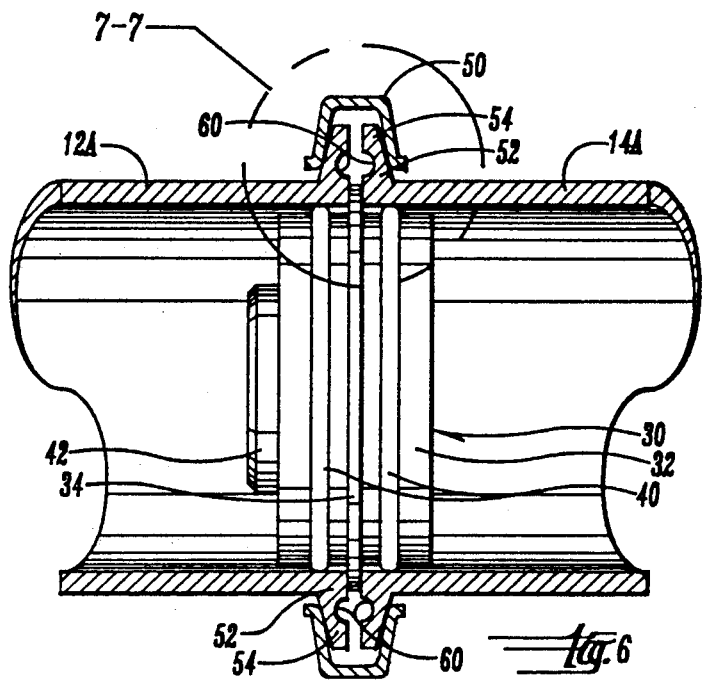
FIG. 6 is a cross-sectional view taken along line 6—6 in FIG. 5.
Figure 7:
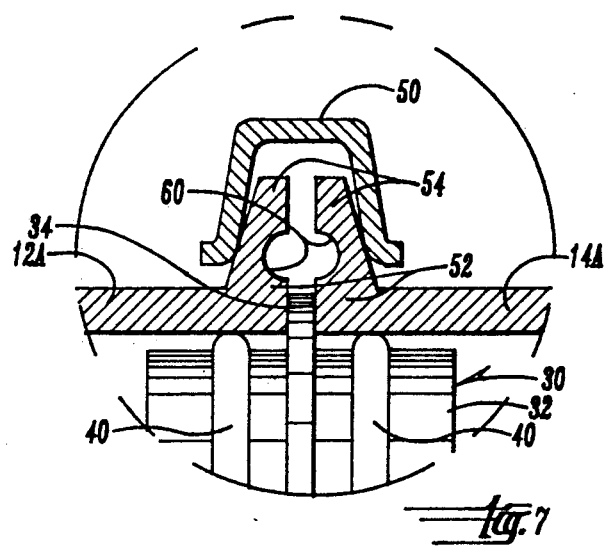
FIG. 7 is an enlarged cross-sectional view of the assembly indicated by the line 7—7 in FIG. 6.

The valve and pipe coupling assembly of this invention is referred to generally in FIG. 1 by the reference numeral 10 and is seen to include a pair of pipe sections 12 and 14 interconnected by a threaded clamp 16. The pipe sections 12 and 14 have end portions with abutting annular shoulders 18 and 20 respectively. The clamp 16 includes threads 22 which engage threads 24 on the shoulder 18 to draw the two shoulders 18 and 20 tightly together.

A valve 30 includes a valve body 32 having a centrally disposed annular shoulder 34 positioned between the opposed shoulders 18 and 20 thereby locking the valve 30 in a fixed position within the pipes 12 and 14. A pair of O-rings 40 are provided on opposite sides of the annular shoulder 34 between the valve body 32 and the pipe sections 12 and 14. A conventional one-way valve element 42 is provided in the valve body 32 as seen in FIG. 2.

In FIGS. 4-7 a pair of pipe sections 12A and 14A are interconnected by an over center type clamp 50 which engages the outer faces 52 of annular flanges or shoulders 54 for locking the top sections together.

The annular shoulder 34 of the valve 30 is clamped between the oppositely disposed pipe shoulder, annular shoulders or flanges 52 as seen in FIG. 6. The oppositely disposed O-rings 40 provide the same sealing action as in the embodiment of FIGS. 1-3. The annular flanges or shoulders 52 include facing annular recesses 60 which are adapted to receive an O-ring for sealing the joint. Although an O-ring is not shown, one may be utilized with or without O-rings 40 on the valve 30.

Figure 8:
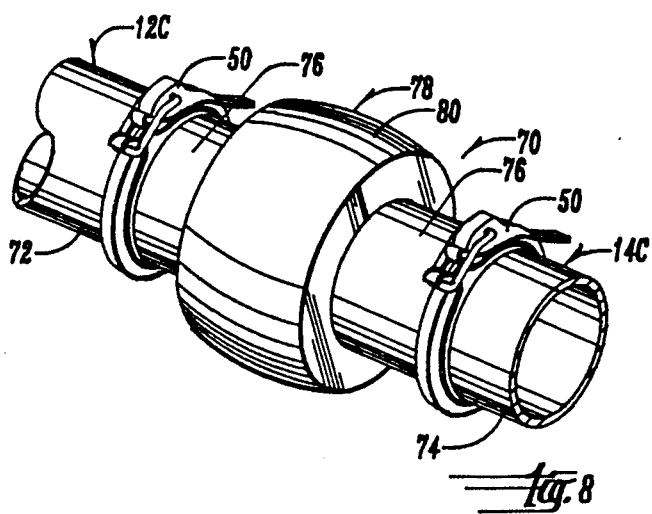
FIG. 8 is a perspective view similar to FIGS. 1 and 4 but showing a prior art valve body having clamps at opposite ends coupled to oppositely disposed pipe portions.

The pipe assembly 70 in FIG. 8 illustrates the prior art which the valve and pipe coupling assembly of FIGS. 1-7 is designed to replace. The pipe assembly 70 includes top sections 12C and 14C having end portions 72 and 74 respectively spaced apart but interconnected by the opposite ends 76 of a valve 78 having a valve body 80. A pair of clamps 50 are required for coupling the valve 78 to the pipe sections 12C and 14C.

Thus it is seen that in operation the valve and pipe coupling assembly of this invention greatly simplifies the pipe system by eliminating the need for two pipe clamps and the need to remove a portion of one or both pipe sections 12C and 14C. It is further seen that the valve 30 may be easily removed and repaired if necessary without discarding the entire valve as is often required with the prior art valve 78 of FIG. 8.

We claim:

1. A valve and pipe coupling assembly comprising,
    a pair of pipe sections having end portions in end to end relationship,
    a valve having a valve body including an annular shoulder between oppositely extending valve body portions, said annular shoulder being disposed between said pair of pipe section end portions, said annular shoulder including oppositely disposed surfaces engaged by the end portions of said pair of pipe sections,
    seal means including first and second annular seals disposed on said valve body portions on opposite sides of said annular shoulder between said valve body and said pipe section end portions, and said first and second annular seals being the sole sealing means between said valve body and said pipe sections, and
    a clamp means engaging said pair of pipe section end portions to lock said end portions together with said valve body being locked therebetween, and said clamp means being the sole means for holding said end portions together.

2. The structure of claim 1 wherein said first and second seals are further defined as being O-rings embracing said valve body on opposite sides of said annular shoulder.

* * * * *